(12) United States Patent
Okamoto et al.

(10) Patent No.: US 6,853,408 B2
(45) Date of Patent: Feb. 8, 2005

(54) CF ON TFT LIQUID CRYSTAL DISPLAY HAVING REDUCED DOT DEFECTS

(75) Inventors: Mamoru Okamoto, Tokyo (JP); Michiaki Sakamoto, Tokyo (JP); Masanobu Hidehira, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 111 days.

(21) Appl. No.: 10/102,871

(22) Filed: Mar. 22, 2002

(65) Prior Publication Data

US 2002/0140883 A1 Oct. 3, 2002

(30) Foreign Application Priority Data

Mar. 29, 2001 (JP) .................................. 2001-096727

(51) Int. Cl.⁷ .............................................. G02F 1/136
(52) U.S. Cl. ...................... 349/44; 349/110; 349/111
(58) Field of Search ............................ 349/44, 110, 111

(56) References Cited

U.S. PATENT DOCUMENTS

| | | | | |
|---|---|---|---|---|
| 5,907,379 A | * | 5/1999 | Kim et al. | 349/141 |
| 5,926,702 A | * | 7/1999 | Kwon et al. | 438/158 |
| 5,933,208 A | * | 8/1999 | Kim | 349/106 |
| 6,011,600 A | * | 1/2000 | Kamada et al. | 349/44 |
| 6,067,131 A | * | 5/2000 | Sato | 349/43 |
| 6,088,070 A | * | 7/2000 | Ohtani et al. | 349/38 |
| 6,104,462 A | * | 8/2000 | Kurosaki et al. | 349/138 |
| 6,118,505 A | * | 9/2000 | Nagata et al. | 349/106 |
| 6,137,552 A | * | 10/2000 | Yanai | 349/44 |
| 6,373,540 B1 | * | 4/2002 | Munakata | 349/117 |
| 6,657,682 B2 | * | 12/2003 | Anno et al. | 349/44 |
| 6,724,443 B1 | * | 4/2004 | Sano et al. | 349/39 |

FOREIGN PATENT DOCUMENTS

| JP | 2000-231123 | 8/2000 |
|---|---|---|
| KR | 1999-0056751 | 7/1999 |

* cited by examiner

*Primary Examiner*—Tarifur R. Chowdhury
*Assistant Examiner*—P. R. Akkapeddi
(74) *Attorney, Agent, or Firm*—Foley & Lardner LLP (57) ABSTRACT

A CF on TFT type liquid crystal display and a method of manufacturing the same. The liquid crystal display has a plurality of parallel scanning lines, a plurality of parallel data lines which cross the scanning lines, thin film transistors each disposed in the proximity of an intersection between one of the scanning lines and one of the data lines, and pixel electrodes disposed in a matrix and each coupled with one of the thin film transistors. The light shield film is formed over areas including at least the thin film transistors but except over portions which become banks and hinder flow of developer for patterning the light shield film. As an embodiment, the light shield film can be formed along the data lines, and also partially along the scanning lines except a part of each portion of the scanning lines between adjacent data lines.

7 Claims, 9 Drawing Sheets (CROSS SECTION ALONG B-B)

FIG. 3 (CROSS SECTION ALONG C-C)

FIG. 4 (CROSS SECTION ALONG A-A)

FIG. 5 (CROSS SECTION ALONG B-B)

ENLARGED

ARRANGEMENT OF PIXELS WITHIN LCD PANEL

PRIOR ART

FIG. 12

PRIOR ART

PRIOR ART

CF ON TFT LIQUID CRYSTAL DISPLAY HAVING REDUCED DOT DEFECTS

FIELD OF THE INVENTION

The present invention relates generally to a liquid crystal display and a method of manufacturing the same. More particularly, the present invention relates to a liquid crystal display which has a CF on TFT (color filter on thin film transistor) structure and which has reduced dot defects.

BACKGROUND OF THE INVENTION

In order to realize a liquid crystal display having high resolution, it is necessary to increase a density of disposition of pixels. In a conventional liquid crystal display in which a color filter and a light shield film are disposed on the side of an opposing substrate, it was difficult to maximize an area of an aperture portion of each pixel, that is, it was difficult to maximize an aperture ratio of each pixel. This is because, in such liquid crystal display, since there is a possibility that an error occurs in the alignment of pixel locations between a TFT substrate and an opposing substrate in a fabrication process in which the TFT substrate and the opposing substrate are assembled. Therefore, it is necessary to previously form components of pixels and the like on both the TFT substrate and the opposing substrate with margins for error.

On the other hand, there is proposed a liquid crystal display having what is called the CF on TFT structure. In the CF on TFT structure, the color filter and the light shield film or layer are formed on the side of an active matrix substrate on which switching elements such as thin film transistors (TFT's) and the like are formed. In the CF on TFT structure, since the color filter and the light shield film are formed on the side of the TFT substrate which has pixel electrodes, it is not necessary to take margins for error in the alignment between the pixel electrodes and the color filter into consideration. As a result, it becomes possible to simplify a manufacturing process of the liquid crystal display and to improve an aperture ratio of each pixel in the liquid crystal display.

Figure 11:
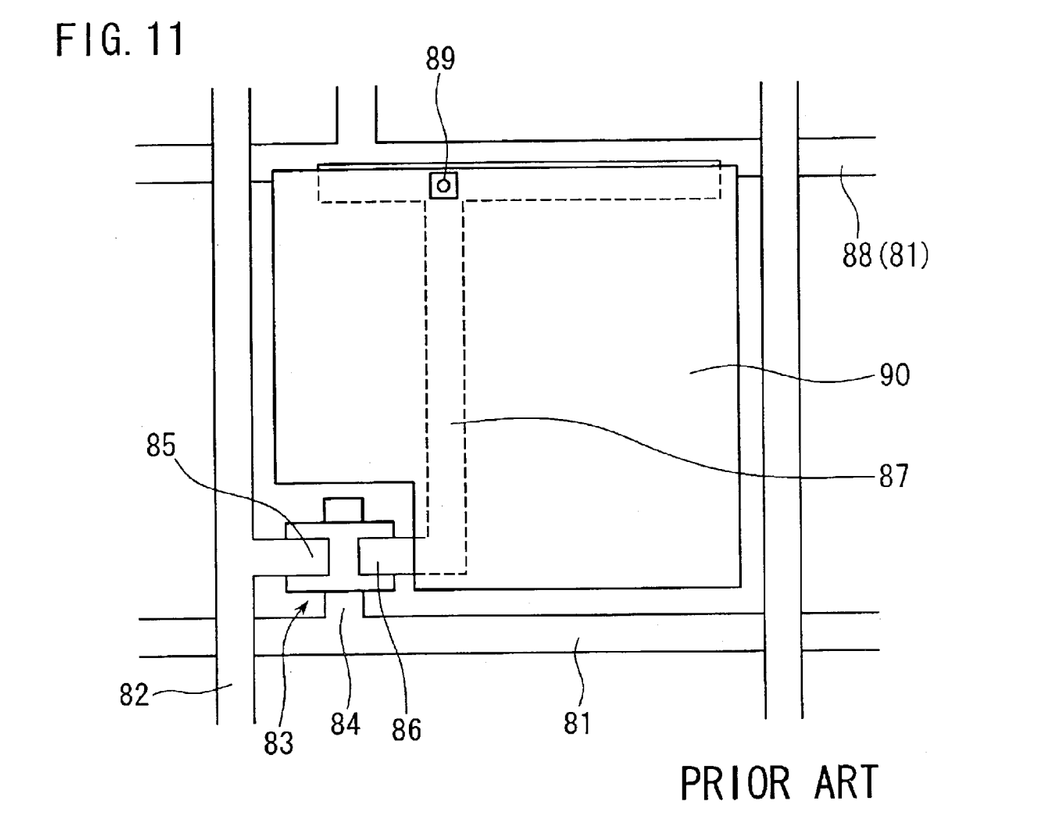
FIG. 11 is a partial enlarged plan view showing a pixel portion of a conventional liquid crystal display having the CF on TFT structure.
Figure 12:
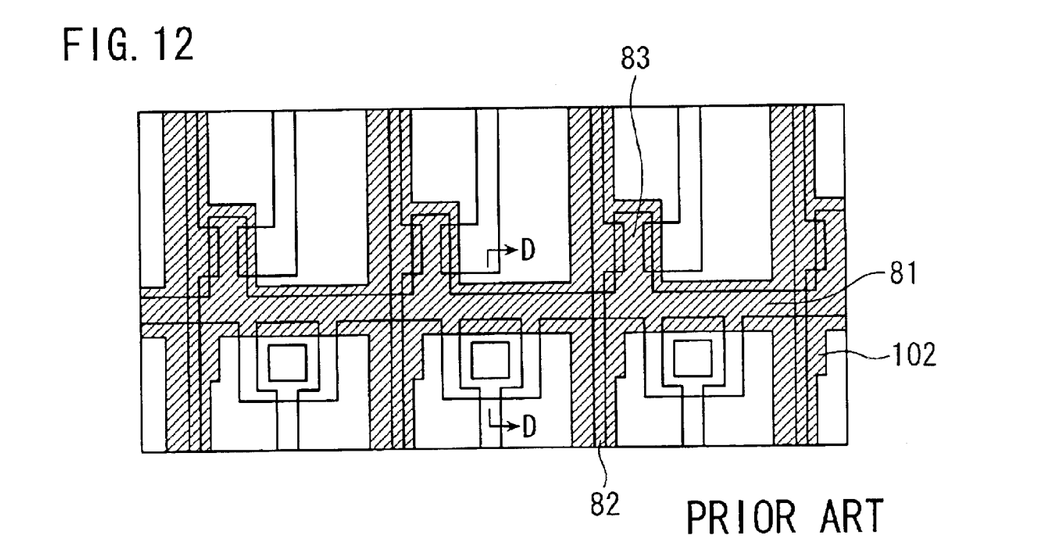
FIG. 12 is a partial enlarged plan view showing a portion including TFT portions and contact hole portions of the liquid crystal display of FIG. 11.

FIG. 11 is a partial enlarged plan view showing a pixel portion of a conventional liquid crystal display having the CF on TFT structure. FIG. 12 is a partial enlarged plan view showing a portion including TFT portions and contact hole portions of the liquid crystal display of FIG. 11.

In the structure shown in FIG. 11, a plurality of scanning lines (gate signal lines) 81 are disposed parallel to each other. Also, a plurality of data lines (source signal lines) 82 are disposed parallel to each other and perpendicularly to the scanning lines 81. In the proximity of each of the intersections between the scanning lines and the data lines, there is disposed a thin film transistor (TFT) 83. A gate electrode 84 of the TFT 83 is coupled with the scanning line 81, a source electrode 85 is coupled with the data line 82, and a drain electrode 86 is coupled with a drain signal line 87. The drain signal line 87 is a wiring conductor which constitute a storage capacitor with an adjacent scanning line 88, and is coupled with a pixel electrode 90 via a contact hole 89 in the proximity of the adjacent scanning line 88.

Also, as shown in FIG. 12, a light shield layer or film 102 is formed on the TFT's 83, the data lines 82 and the scanning lines 81, in the shape of a grid.

With reference to FIG. 13A through FIG. 13F, an explanation will be made on a method of manufacturing the above-mentioned conventional liquid crystal display. FIG. 13A through FIG. 13F are partial cross sectional views taken along the line D—D of FIG. 12, and illustrate cross sections of workpieces during a process of manufacturing the conventional liquid crystal display.

Figure 13A:
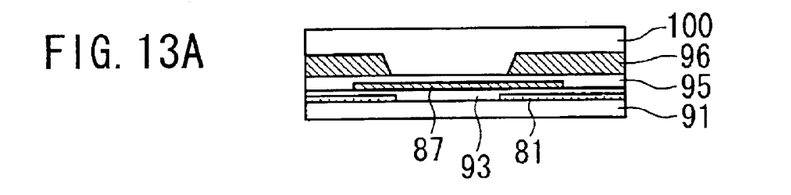
FIG. 13A through FIG. 13F are partial cross sectional views taken along the line D—D of FIG. 12, and illustrate cross sections of workpieces during a process of manufacturing the conventional liquid crystal display.

First, as shown in FIG. 13A, on a transparent insulating substrate 91 which may be, for example, a glass substrate and the like, a metal film made of aluminum (Al), molybdenum (Mo), chromium (Cr) and the like is formed by a sputtering method to a thickness of 100–400 nm. The metal film is patterned by a photolithography method and thereby the scanning lines (gate signal lines) 81 are formed.

A film such as a silicon nitride film and the like is then formed as a gate insulating film 93 on the scanning lines 81 by using a CVD method and the like. The gate insulating film 93 has a thickness of approximately 100–200 nm. Then, on the gate insulating film 93, a metal film made of aluminum (Al), molybdenum (Mo), chromium (Cr) and the like is formed by a sputtering method to a thickness of 100–400 nm. The metal film is patterned by a photolithography method and thereby the drain signal lines 87 are formed. Further, a silicon nitride film is formed as a passivation film 95 to cover these components to a film thickness of approximately 100–200 nm.

Next, for example, a negative photo-curable color photoresist which is obtained by dispersing green pigment in acrylic resin is applied on the passivation film 95 by spin coating. The film thickness of the color photoresist is adjusted approximately to 1.5 $\mu$m by controlling a spinning speed of the substrate. Then, the workpiece is pre-baked at 80 degrees Celsius for 2 (two) minutes by using a hot plate, and predetermined patterns are exposed on the color photoresist. Thereafter, the exposed workpiece is developed by using tetramethylammonium hydroxide (TMAH) developer and thereby green color filter 96 is formed at each of predetermined portions. In this case, an opening is previously formed at an area where a contact hole 89 for coupling a drain signal line 87 and a pixel electrode 90 is to be formed at a later process. The size of this opening should be a size in which at least the contact hole 89 is contained. Next, the workpiece is burned at 230 degrees Celsius for 60 minutes in a clean oven and thereby the green color filters 96 are cured.

Red color filters and blue color filters are also formed adjacently by a method similar to the method mentioned above with respect to the green color filters 96.

After forming the color filters, photosensitive resist or photoresist, i.e., light shield film resin, 100 which is obtained by dispersing insulating carbon and the like in acrylic resin is applied on the color filters and the like by spin coating. The film thickness of the photoresist is adjusted approximately to 1.5 $\mu$m by controlling a spinning speed of the substrate.

Figure 13B:
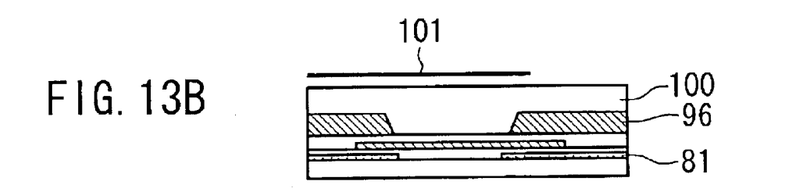

As shown in FIG. 13B, a photo mask 101 is prepared by patterning a metal light shield film which is made, for example, of chromium and the like and which is formed on a quartz substrate. By using the photo mask 101, the photoresist 100 on the color filter 96 over the scanning line, i.e., the gate signal line, 81 is exposed, and the photoresist 100 is cured.

Figure 13C:
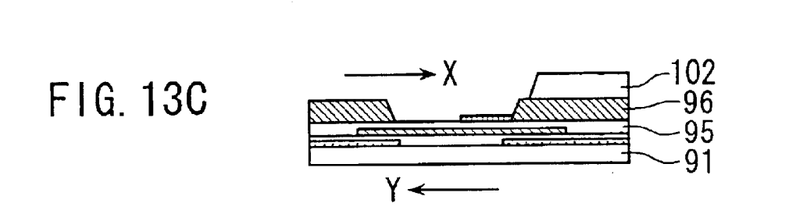

As shown in FIG. 13C, after removing the photo mask 101, the workpiece is passed under a shower of developer and thereby portions of the photoresist 100 which are not cured are removed to form a light shield film 102. In this process, since the developer falls onto the transparent insulating substrate 91 from upside as a shower, if the transparent insulating substrate 91 moves in Y direction shown in FIG. 13C, the developer flows in X direction shown in FIG. 13C. In this case, the step portion formed by a stack of the color filter 96 and the light shield film 102 functions like a bank, and therefore residue of the photoresist 100 remains on the passivation film 95 in the area where the contact hole 89 is to be formed. Thereafter, the light shield film 102 is burned at 230 degrees Celsius for 60 minutes to cure it. When the light shield film 102 is burned and cured, the residue on the passivation film 95 is also burned and cured at the same time.

Figure 13D:
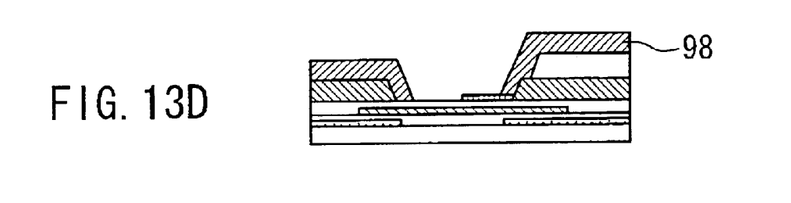

As shown in FIG. 13D, for example, transparent photosensitive resin of acrylic system is applied to a thickness of approximately 2.5 μm. Then the transparent photosensitive acrylic resin is patterned by using a pattern exposure and development process such that an opening is formed at the portion of the contact hole 89. Further, the workpiece is burned and cured at 230 degrees Celsius for 60 minutes, and thereby an overcoat layer 98 is formed.

Figure 13E:
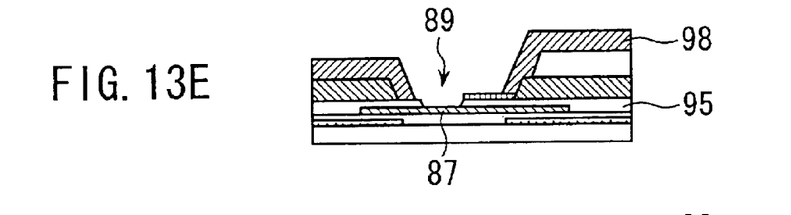

As shown in FIG. 13E, for example, novolac type photoresist is applied onto the workpiece substrate and patterned into predetermined patterns. By using the patterned novolac type photoresist film as a mask, the passivation film 95 is etched to form the contact hole 89. In this case, since there is the residue in the contact hole 89 as mentioned above, it is impossible completely remove the passivation film 95 within the contact hole 89. Therefore, the contact area between the drain signal line 87 and the pixel electrode 90 becomes narrow.

Figure 13F:
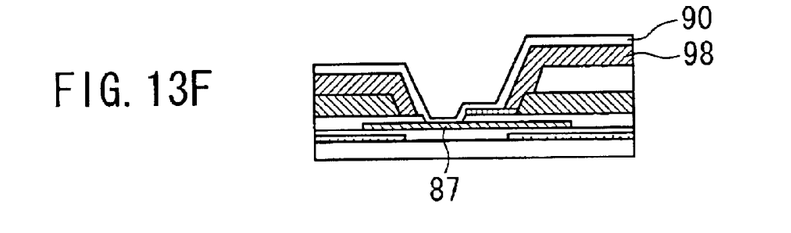

As shown in FIG. 13F, after removing the novolac type photoresist film, a transparent conductive film made of, for example, Indium Tin Oxide (ITO) and the like is formed on the overcoat layer 98 and the drain signal line 87 exposed via the contact hole 89 by using a sputtering method. The transparent conductive film is then patterned to form a pixel electrode 90. Since the contact area between the drain signal line 87 and the pixel electrode 90 is narrow as mentioned above, the contact resistance between the drain signal line 87 and the pixel electrode 90 becomes relatively large.

Thereafter, the TFT substrate obtained in this way is assembled with an opposing substrate, and the gap between the TFT substrate and the opposing substrate is filled with liquid crystal material. Thereby, a liquid crystal display panel is completed.

As another prior art, Japanese patent laid-open publication No. 2000-231123 discloses a method of manufacturing a liquid crystal display in which residue of light shield film resin does not remain within each contact hole. In the method described in this publication, when color filters or a black matrix which becomes a light shield film are formed, an opening is previously provided in each area which includes a contact hole, and the black matrix is formed after forming the color filters. In this case, at a portion where each color filter contacts the black matrix, an end portion of the black matrix overlies an end portion of the color filter. In this way, the black matrix partially overlaps the color filters, and portions of the side wall of the black matrix at least in the proximity of a passivation film are protected by the color filters. Thereby, peeling off of patterns of the black matrix can be prevented.

In the conventional liquid crystal display and the manufacturing method thereof mentioned above with reference to FIG. 11, FIG. 12 and FIGS. 13A–13F, when the resin light shield film is patterned into a grid shape and a contact hole is formed within each area surrounded by the grid shaped resin light shield film, it is impossible to completely remove resin of the light shield film within each contact hole. This is because the grid shaped resin light shield film functions as banks. Therefore, the resin of the light shield film remains within each contact hole as residue after development.

Even when the passivation film is removed thereafter, it is impossible to remove the portion of the passivation film just under the light shield film resin remained after development. Therefore, contact of the drain electrode or the drain signal line with the pixel electrode is deteriorated, and such deterioration of contact causes a dot defect.

In this way, when the light shield film is formed in a grid shape or a matrix, there is high possibility that defective contacts, i.e., dot defects are caused by the residue of the light shield film resin after development. The probability of occurrence of 20 or more dot defects per panel is approximately 20 percent.

Also, in the method described in Japanese patent laid-open publication No. 2000-231123, in a manufacturing process of a liquid crystal display panel, when the light shield film resin is removed by the developer and when the substrate having the CF on TFT structure is transported in one direction and, therefore, the developer flows in another one direction, the light shield film functions as a bank. Therefore, residue of the light shield film resin remains within each contact hole.

SUMMARY OF THE INVENTION

Therefore, it is an object of the present invention to provide a liquid crystal display and a manufacturing method thereof in which a probability of occurrence of dot defects can be greatly reduced.

It is another object of the present invention to provide a CF on TFT type liquid crystal display which has high resolution and in which a probability of occurrence of dot defects can be greatly reduced and to provide a manufacturing method of such liquid crystal display.

It is still another object of the present invention to provide a CF on TFT type liquid crystal display and a manufacturing method thereof in which reliability and completeness of contact between drain electrodes or drain signal lines and pixel electrodes can be greatly improved.

It is still another object of the present invention to provide a CF on TFT type liquid crystal display and a manufacturing method thereof in which, in a process of patterning a light shield resin film by using developer, residue of the light shield resin film does not remain in each contact hole even when the developer flows in one direction.

It is still another object of the present invention to obviate the disadvantages of the conventional CF on TFT type liquid crystal display.

According to an aspect of the present invention, there is provided a method of manufacturing a liquid crystal display having a plurality of parallel scanning lines, a plurality of parallel data lines which cross the scanning lines, thin film transistors each disposed in the proximity of an intersection between one of the scanning lines and one of the data lines, and pixel electrodes disposed in a matrix and each coupled with one of the thin film transistors, the method comprising: forming a light shield film over portions including at least the thin film transistors but except over portions which become banks and hinder flow of developer for patterning the light shield film.

In this case, it is preferable that, in the forming the light shield film, the light shield film is also formed over and along the data lines.

It is also preferable that, in the forming the light shield film, the light shield film is also formed partially over and along the scanning lines, except over and along a part of each portion of the scanning lines between adjacent data lines.

It is further preferable that, in the forming the light shield film, the light shield film is also formed over and along the scanning lines.

It is advantageous that, in the forming the light shield film, the light shield film is also formed partially over and along the data lines, except over and along a part of each portion of the data lines between adjacent scanning lines.

It is also advantageous that, wherein the liquid crystal display comprises a contact hole in each of areas surrounded by the scanning lines and the data lines, and wherein, in the forming the light shield film, the light shield film is not formed over portions which become banks and hinder flow of the developer flowing through portions where the contact holes are to be formed.

It is further advantageous that, wherein, in the forming the light shield film, the developer flows along a longitudinal direction of each of the pixel electrodes.

It is preferable that each of the pixel electrodes is formed into an elongated rectangular shape.

According to another aspect of the present invention, there is provided a liquid crystal display comprising: a plurality of scanning lines disposed parallel to each other; a plurality of data lines which are disposed parallel to each other and which cross the scanning lines; thin film transistors each disposed in the proximity of an intersection between one of the scanning lines and one of the data lines; pixel electrodes disposed in a matrix and each coupled with one of the thin film transistors; and a light shield film which is formed at least over the thin film transistors, but which is not formed over a part of each portion of the scanning lines between adjacent data lines or over a part of each portion of the data lines between adjacent scanning lines.

In this case, it is preferable that the light shield film is also formed over and along the data lines.

It is also preferable that the light shield film is also formed partially over and along the scanning lines, except over and along a part of each portion of the scanning lines between adjacent data lines.

It is further preferable that the light shield film is also formed over and along the scanning lines.

It is advantageous that, in the forming the light shield film, the light shield film is also formed partially over and along the data lines, except over and along a part of each portion of the data lines between adjacent scanning lines.

It is also advantageous that the liquid crystal display comprises a contact hole in each of areas surrounded by the scanning lines and the data lines.

It is further advantageous that each of the pixel electrodes has an elongated rectangular shape which is elongated along the data lines and wherein the light shield film is not formed over and along a part of each portion of the scanning lines between adjacent data lines.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, embodiments of the present invention will now be explained in detail.

Figure 1:
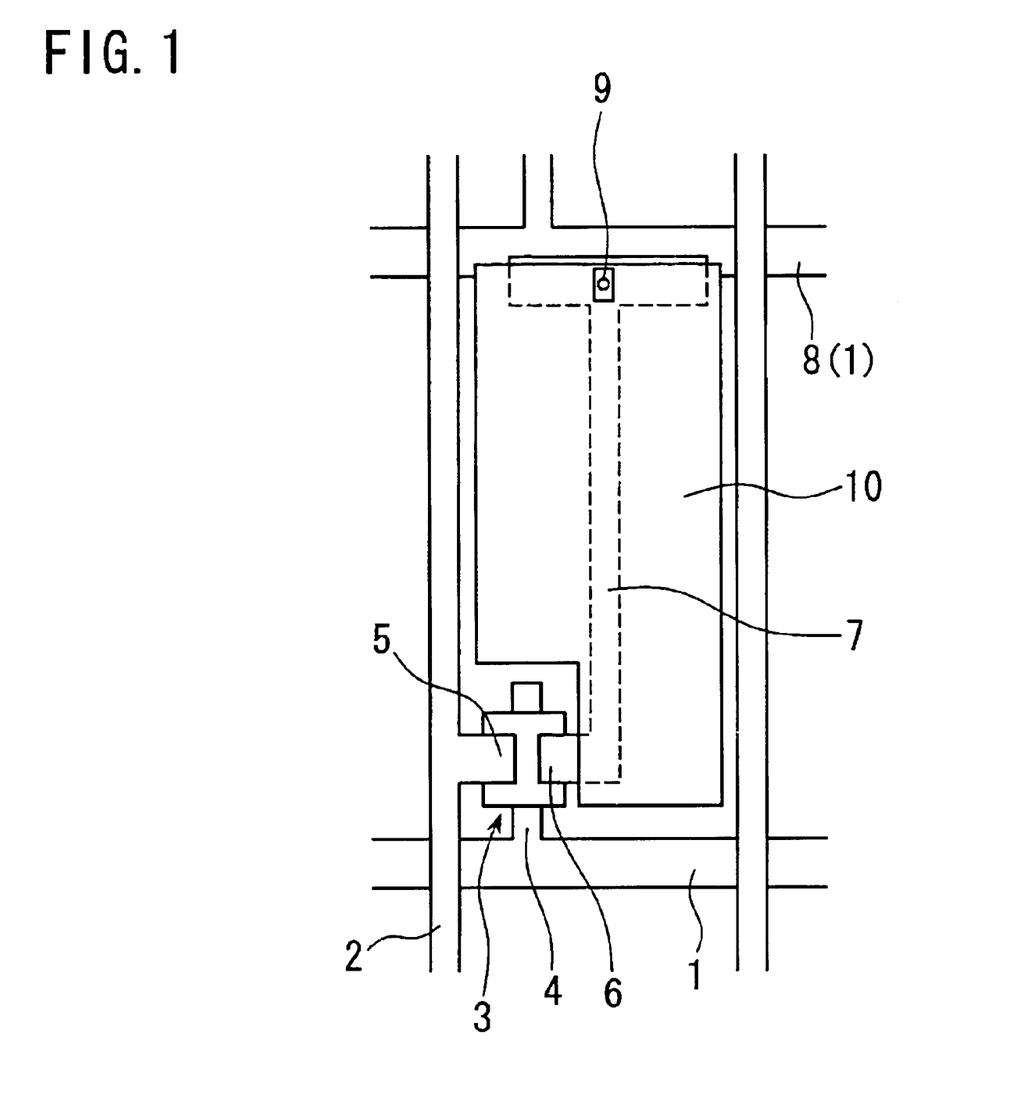
FIG. 1 is a partial schematic plan view showing a pixel portion of a liquid crystal display according to a first embodiment of the present invention.

FIG. 1 is a partial schematic plan view showing a pixel portion of a liquid crystal display according to a first embodiment of the present invention. In the liquid crystal display shown in FIG. 1, a plurality of scanning lines (gate signal lines) 1 are disposed parallel to each other. Also, a plurality of data lines (source signal lines) 2 are disposed parallel to each other and perpendicularly to the scanning lines 1. In the proximity of each of the intersections between the scanning lines and the data lines, there is disposed a thin film transistor (TFT) 3. A gate electrode 4 of the TFT 3 is coupled with the scanning line 1, a source electrode 5 is coupled with the data line 2, and a drain electrode 6 is coupled with a drain signal line 7. The drain signal line 7 is coupled with a pixel electrode 10 via a contact hole 9 in the proximity of the adjacent scanning line (gate signal line) 8. The pixel electrode 10 coupled with the drain signal line 7 constitutes pixel capacitance with an opposing electrode formed on an opposing substrate via a liquid crystal layer interposed therebetween. The drain signal line 7 also has a portion formed along the adjacent scanning line 8, and forms additional capacitance or storage capacitance with the adjacent scanning line 8.

Generally, in a liquid crystal display, when an area of each pixel becomes minute in order to fulfill the requirement for realizing high display resolution, the pixel capacitance in the pixel area becomes small. If the pixel capacitance is small, the potential of each pixel electrode falls rapidly and it becomes impossible to maintain the potential of each pixel electrode for a time period of one frame, even if a TFT having a high off-resistance is used to reduce a leakage current. Thus, there is provided the additional capacitance which is coupled parallel to the pixel capacitance to improve retaining characteristics of the potential of each pixel electrode for display.

As mentioned above, the drain signal line 7 has the portion formed along the adjacent scanning line 8 to form the additional capacitance. The reason why the portion of the drain signal line 7 is formed along the adjacent scanning line 8 is to increase an aperture ratio of each pixel. Also, the shape of each pixel electrode 10 is approximately rectangular which is elongated in the direction of the data line 2.

Figure 2:
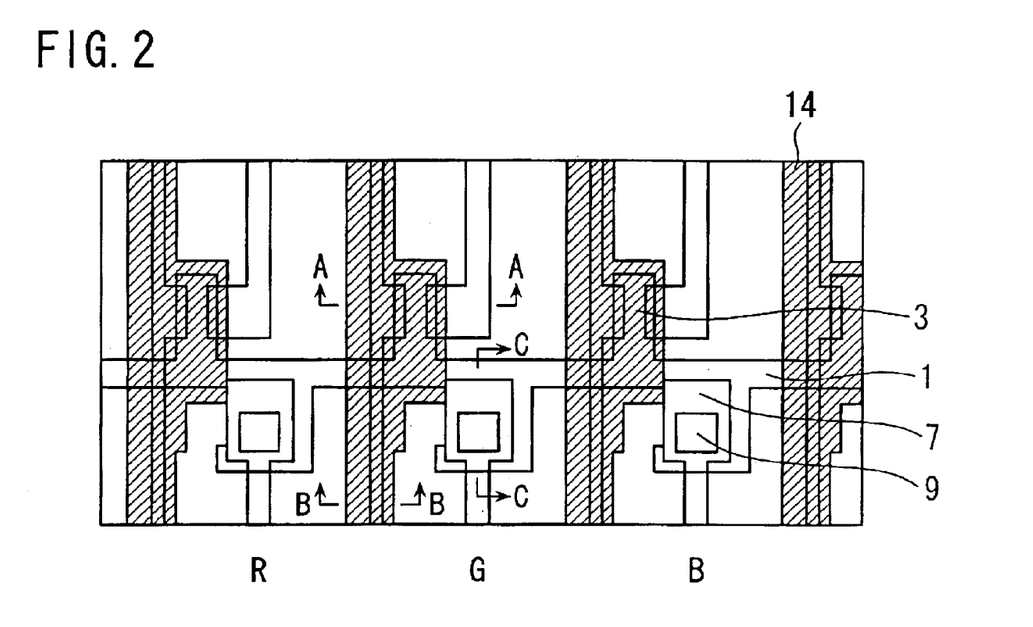
FIG. 2 is a partial enlarged plan view showing a portion including TFT portions and contact hole portions of the liquid crystal display of FIG. 1.

FIG. 2 is a partial enlarged plan view showing a portion including TFT portions and contact hole portions of the liquid crystal display of FIG. 1. Also, FIG. 3 is a partial cross sectional view taken along the line C—C of FIG. 2.

Figure 3:
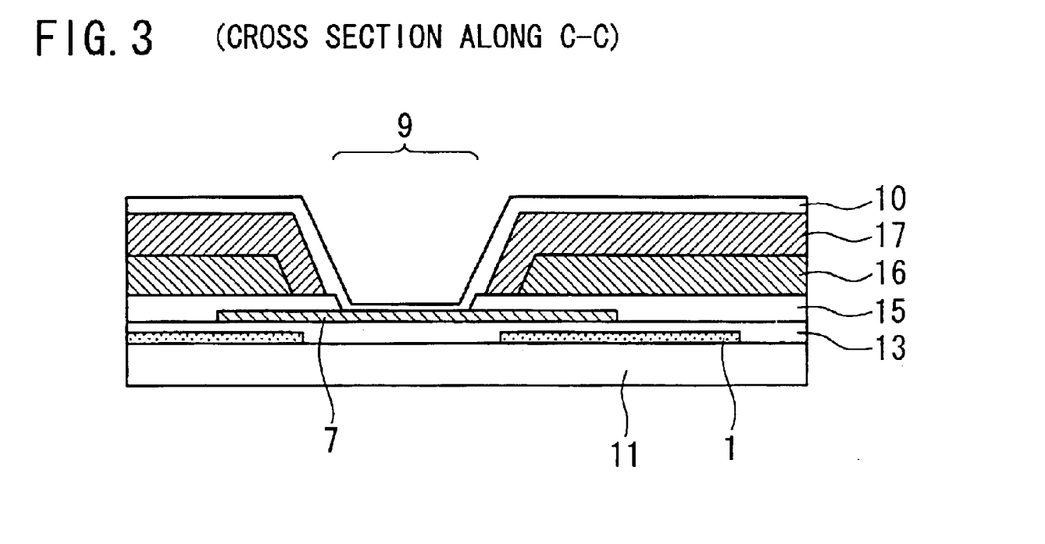
FIG. 3 is a partial cross sectional view taken along the line C—C of FIG. 2.

As shown in FIG. 2 and FIG. 3, on a transparent insulating substrate 11, a scanning line (a gate signal line) 1 is formed except portions where contact holes are formed. Also, a gate insulating film 13 is formed on the scanning line 1 and the like. Further, a drain signal line 7 is formed on the gate insulating film 13 such that the drain signal line 7 partially overlaps the scanning line 1. Thereby, the above-mentioned additional capacitance is formed between the scanning line 1 and the drain signal line 7.

Further, a passivation film 15, a color filter 16 and an overcoat layer 17 are stacked in this order on the workpiece obtained as above. On the overcoat layer 17, a pixel electrode 10 is formed. The pixel electrode 10 is coupled with the drain signal line 7 via the contact hole 9 which penetrates the overcoat layer 17, the color filter 16 and the passivation film 15.

Figure 4:
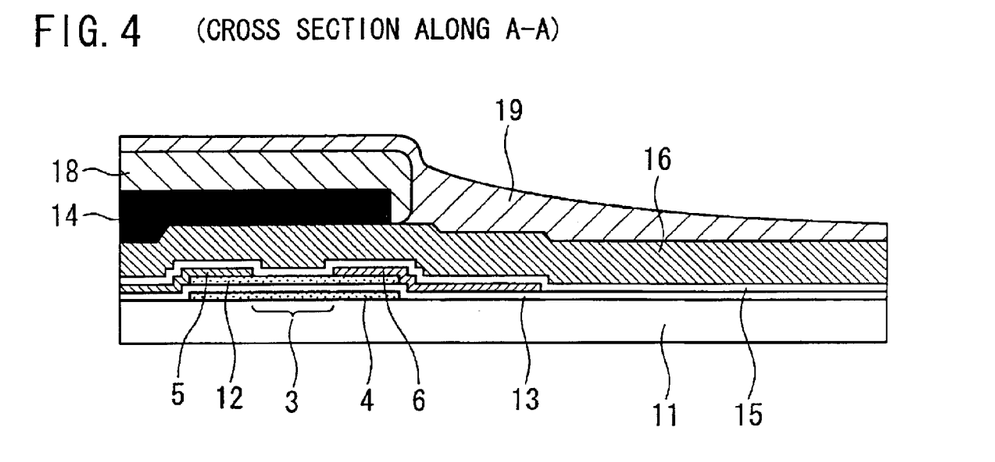
FIG. 4 is a partial cross sectional view taken along the line A—A of FIG. 2.

FIG. 4 is a partial cross sectional view taken along the line A—A of FIG. 2. As shown in FIG. 2 and FIG. 4, a thin film transistor (TFT) 3 is formed on the transparent insulating substrate 11. That is, a gate electrode 4 is formed on the transparent insulating substrate 11, and a gate insulating film 13 is formed to cover the gate electrode 4. Also, a semiconductor layer 12 is formed on the gate insulating film 13 such that the semiconductor layer 12 comes over the gate electrode 4. A source electrode 5 and a drain electrode 6 are coupled to the upper surface of the semiconductor layer 12 and are separated from each other at the portion corresponding to the central portion of the semiconductor layer 12. The source electrode 5 and the drain electrode 6 are respectively coupled to the semiconductor layer 12, and thereby the TFT 3 is formed. Further, a passivation film 15 is formed so as to cover whole portion of the substrate including the portion of the TFT 3, and a color filter 16 is formed on the passivation film 15. Also, on the portion of the color filter 16 over the TFT 3, there is formed a light shield film 14. On the light shield film 14, a first overcoat layer 18 is formed, and a second overcoat layer 19 is formed on whole portion of the substrate including the portion on the first overcoat layer 18.

Figure 5:
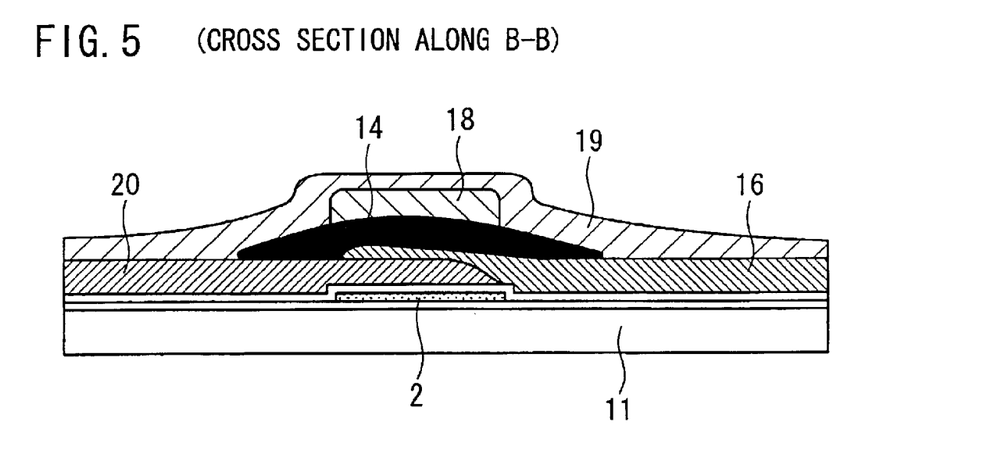
FIG. 5 is a partial cross sectional view taken along the line B—B of FIG. 2.

FIG. 5 is a partial cross sectional view taken along the line B—B of FIG. 2. As shown in FIG. 2 and FIG. 5, a data line 2 is formed on a transparent insulating substrate 11. In one pixel area on the transparent insulating substrate 11 and on the data line 2, a color filter 20 is formed, and in other pixel area on the transparent insulating substrate 11 and on the color filter 20 on the data line 2, there is formed a color filter 16 having different color from that of the color filter 20. Also, a light shield film 14 is formed such that the light shield film 14 covers the data line 2 and neighboring portions thereof. On the light shield film 14, a first overcoat layer 18 is formed, and a second overcoat layer 19 is formed on whole portion of the substrate including the portion on the first overcoat layer 18.

As apparent from FIG. 2, FIG. 3, FIG. 4 and FIG. 5, in the liquid crystal display according to the present invention, the light shield film is formed on the data lines and on the TFT portions in a stripe arrangement, but the light shield film is not formed on the scanning lines (the gate signal lines) 1 except portions intersecting the data lines 2.

With reference to FIG. 6A through FIG. 6D, an explanation will now be made on a method of manufacturing the liquid crystal display according to the present invention. FIG. 6A through FIG. 6D are partial cross sectional views taken along the line C—C of FIG. 2, and illustrate cross sections of workpieces during a process of manufacturing the liquid crystal display according to the present invention.

Figure 6A:
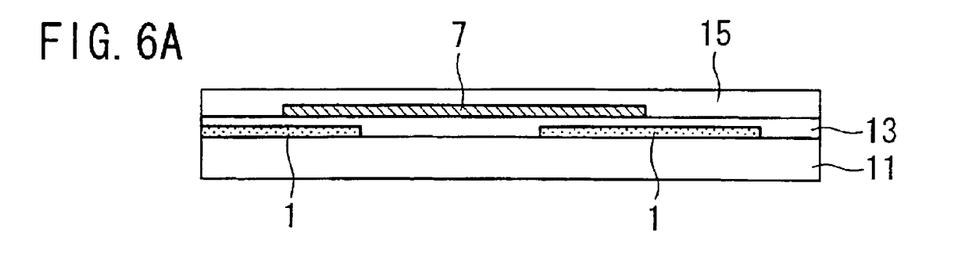
FIG. 6A through FIG. 6D are partial cross sectional views taken along the line C—C of FIG. 2, and illustrate cross sections of workpieces during a process of manufacturing the liquid crystal display according to the present invention.

First, as shown in FIG. 6A, on a transparent insulating substrate 11 which may be, for example, a glass substrate and the like, a metal film made of aluminum (Al), molybdenum (Mo), chromium (Cr) and the like is formed by a sputtering method to a thickness of 100–400 nm. The metal film is patterned by a photolithography method and thereby a scanning line (gate signal line) 1 is formed.

A film such as a silicon nitride film and the like is then formed as a gate insulating film 13 on the scanning line 1 by using a CVD method and the like. The gate insulating film 13 has a thickness of approximately 100–200 nm. Then, on the gate insulating film 13, a metal film made of aluminum (Al), molybdenum (Mo), chromium (Cr) and the like is formed, for example, by a sputtering method to a thickness of 100–400 nm. The metal film is patterned by a photolithography method and thereby a drain signal line 7 is formed. Further, a silicon nitride film is formed on whole area of the substrate as a passivation film 15 to a film thickness of approximately 100–200 nm.

Figure 6B:
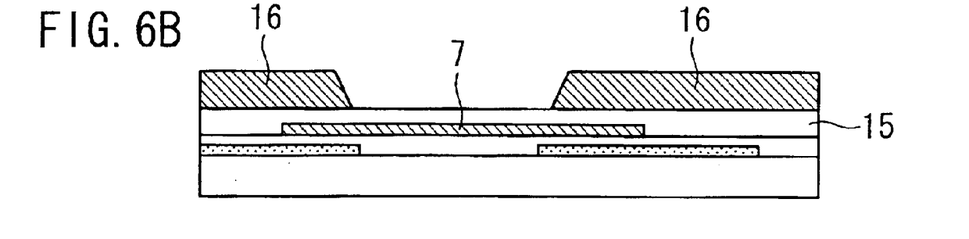

Next, as shown in FIG. 6B, for example, a negative photo-curable color photoresist which is obtained by dispersing green pigment in acrylic resin is applied on the passivation film 15 by spin coating. The film thickness of the color photoresist is adjusted approximately to 1.5 μm by controlling a spinning speed of the substrate. Then, the workpiece is pre-baked at 80 degrees Celsius for 2 (two) minutes by using a hot plate, and predetermined patterns are exposed on the color photoresist. Thereafter, the exposed workpiece is developed by using tetramethylammonium hydroxide (TMAH) developer and thereby green a color filter 16 is formed at each of predetermined portions. In this case, an opening is previously formed at an area where a contact hole 9 for coupling a drain signal line 7 and a pixel electrode 10 is to be formed at a later process. The size of this opening should be a size in which at least a contact hole 9 is contained. Next, the workpiece is burned at 230 degrees Celsius for 60 minutes in a clean oven and thereby the green color filter 16 is cured.

Red color filters and blue color filters are also formed adjacently by a method similar to the method mentioned above with respect to the green color filters.

Thereafter, a light shield film 14 may be formed on the color filter 16 in a manner as mentioned before. However, in the present invention, the light shield film 14 is not formed at the cross sectional portion along the line C—C and, therefore, the light shield film 14 is not shown in FIGS. 6B–6D.

Figure 6C:
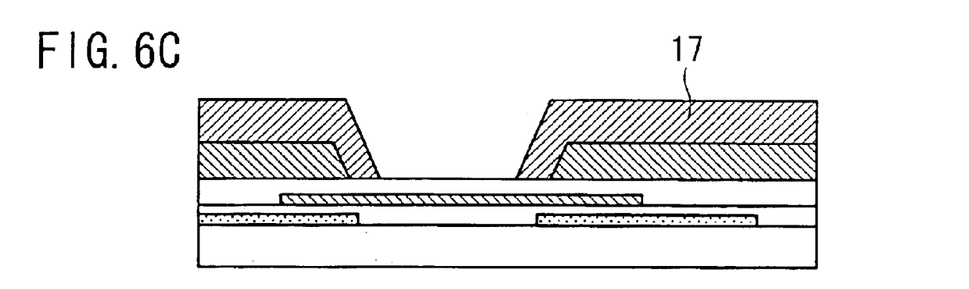

Next, as shown in FIG. 6C, in order to protect the color filters, for example, transparent photosensitive resin or photoresist of acrylic system is applied to a thickness of approximately 2.5 μm. Then the transparent photosensitive acrylic resin is patterned by using a pattern exposure and development process such that an opening is formed at each portion corresponding to the contact hole 9. Further, the workpiece is burned and cured at 230 degrees Celsius for 60 minutes, and thereby an overcoat layer 17 is formed.

Figure 6D:
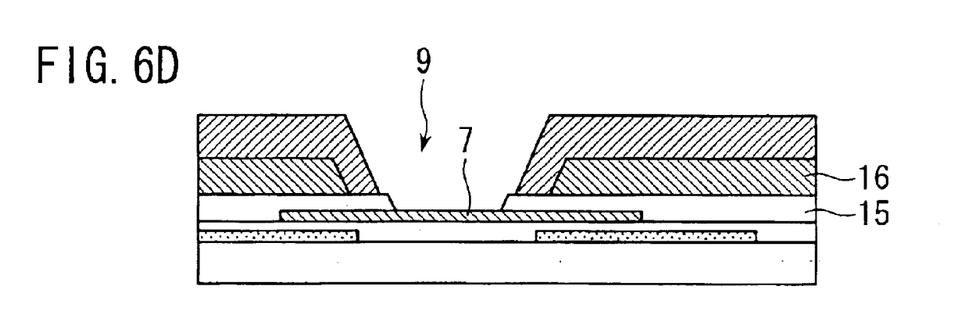

As shown in FIG. 6D, for example, novolac type photoresist is applied onto the workpiece substrate and patterned into predetermined patterns. By using the patterned novolac type photoresist film as a mask, the passivation film 15 is etched to form the contact hole 9. In this case, according to the present invention, since the light shield film is not formed on the color filter 16 at the cross sectional portion along the line C—C, there is no residue of the light shield film in the contact hole 9. Therefore, it is possible to completely remove the passivation film 15 within the contact hole 9.

Next, after removing the novolac type photoresist film, a transparent conductive film made, for example, of Indium Tin Oxide (ITO) and the like is formed on the overcoat layer 17 and the drain signal line 7 exposed via the contact hole 9 by using a sputtering method. The transparent conductive film is then patterned to form each pixel electrode 10. Thereby, the structure having the cross section shown in FIG. 3 is obtained. In this case, it is preferable that the thickness of the transparent conductive film is as large as possible to obtain good coverage such that material of the transparent conductive film is attached thoroughly and such that electrical connection between the transparent conductive film and the drain signal line becomes stable and reliable. However, when taking the workability of the ITO film used as the transparent conductive film into consideration, it is preferable that the film thickness of the transparent conductive film is approximately 100 nm.

Thereafter, the TFT substrate obtained in this way is assembled with an opposing substrate, and the gap between the TFT substrate and the opposing substrate is filled with liquid crystal material. Thereby, a liquid crystal display panel is completed.

As mentioned above, in this embodiment, the light shield film is not formed on the scanning lines except portions intersecting the data lines and the like and, therefore, the step height of each contact hole becomes small. Therefore, when the photo resist is removed by using the developer, no residue of the photo resist remains in the contact hole, and the passivation film within the contact hole can be completely removed. Thus, it is possible to reduce the contact resistance between the drain signal lines and the corresponding pixel electrodes.

Figure 7:
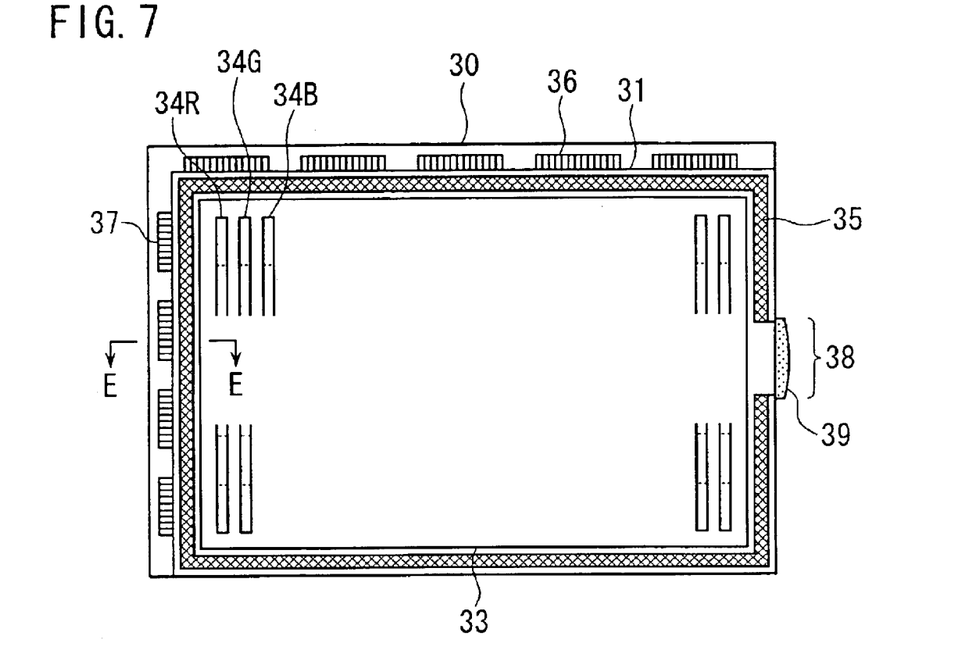
FIG. 7 is a schematic plan view a liquid crystal display panel according to the present invention.
Figure 8:
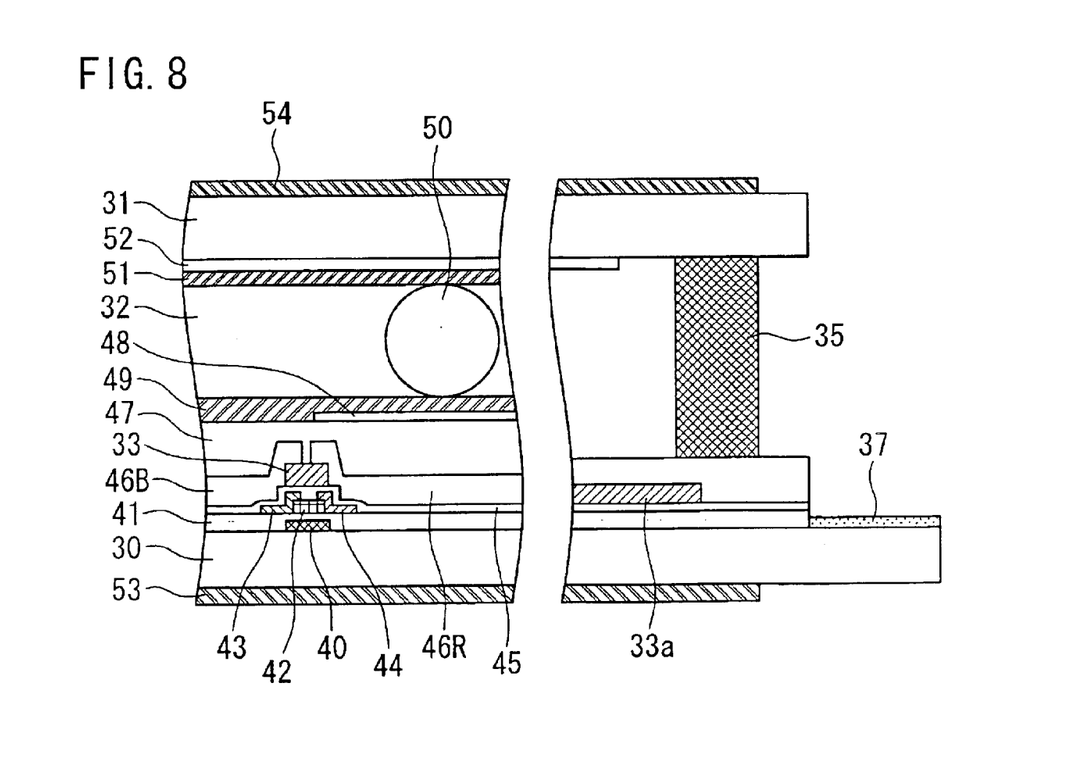
FIG. 8 is a cross sectional view taken along the line E—E of FIG. 7.

FIG. 7 is a schematic plan view a liquid crystal display panel according to the present invention. FIG. 8 is a schematic cross sectional view taken along the line E—E of FIG. 7.

As shown in FIG. 7 and FIG. 8, the liquid crystal display panel according to the present invention comprises a TFT substrate 30 and an opposing substrate 31 each of which comprises a transparent substrate made, for example, of glass and the like and each of which has a rectangular shape. As shown in FIG. 8, the space between the TFT substrate 30 and the opposing substrate 31 is filled with liquid crystal material 32.

On the TFT substrate 30, a light shield film 33 is formed in a stripe arrangement as shown schematically in the drawing (FIG. 7). Between the portions of the light shield film 33 having a stripe arrangement, a plurality of elongated openings 34 are disposed each corresponding to a column of pixel electrodes 48. In each of the elongated openings, a plurality of pixel areas are located which are separated by the scanning lines and each of which corresponds to one pixel electrode. The openings 34 comprise, for example, openings 34R of red color filters, openings 34G of green color filters and openings 34B of blue color filters which are repetitively disposed in order.

The TFT substrate 30 and the opposing substrate 31 are opposed to each other via a predetermined space between them, and are fixed to each other by a sealing material 35 which is disposed along the peripheral portions of the substrates 30 and 31. On the outer portions of the TFT substrate 30 along two sides thereof, signal terminals are disposed. That is, a plurality of horizontal (H) side terminals, i.e., data signal terminals, 36 are disposed along one of lateral edge portions of the panel and extend in a vertical direction, and a plurality of vertical (V) side terminals, i.e., scanning signal terminals, 37 are disposed along one of vertical edge portions of the panel and extend in a lateral direction. The horizontal (H) side terminals 36 and the vertical (V) side terminals 37 are not covered by the opposing substrate 31.

At a portion of the sealing material 35 on the side opposite to the side along which the terminals 37 are disposed, there is disposed an infusion inlet 38 for infusing the liquid crystal material 32 into the gap between the TFT substrate 30 and the opposing substrate 31. The infusion inlet 38 is sealed with a sealing material or sealant 39, after infusing the liquid crystal material into the gap between the TFT substrate 30 and the opposing substrate 31.

As shown in FIG. 8, on the TFT substrate 30, a gate electrode 40 is formed, and, further, a gate insulating film 41 is formed so as to cover the gate electrode 40. On the gate insulating film 41, a semiconductor layer 42 is formed such that the semiconductor layer 42 overlaps the gate electrode 40 via the gate insulating film 41. Also, a source electrode 43 and a drain electrode 44 are disposed which are separated via the space on the central portion of the semiconductor layer 42 and which are coupled with the semiconductor layer 42.

A passivation film 45 is formed to cover the semiconductor layer 42, the source electrode 43, the drain electrode 44 and the like. Thereby, a TFT which is generally called a channel etching type TFT is formed.

On the passivation film 45, a light shield film 33 is formed at portions corresponding to the TFT's. Also, a picture frame light shield film 33a is shown which is formed also in the proximity of the V side terminals 37. Although not shown in detail in the drawing, the picture frame light shield film 33a is formed around the picture display area. Further, red color filters 46R, blue color filters 46B and green color filters (not shown in the drawing) are formed at portions corresponding to the picture display area.

An overcoat layer 47 is formed to cover these color filters 46 and the passivation film 45. A plurality of transparent pixel electrodes 48 are disposed on the overcoat layer 47. The pixel electrodes 48 are made, for example, of an ITO film and are disposed in a matrix.

When the above-mentioned TFT is used as a switching element, the drain electrode 44 functions as a lead electrode for coupling the pixel electrode 48 with the switching element. The drain electrode 44 and the pixel electrode 48 are coupled with each other via a drain signal line (not shown in the drawing) and a contact hole (not shown in the drawing) which is disposed in the proximity of an adjacent scanning line and which penetrates the overcoat layer 47 and the passivation film 45.

The TFT substrate 30 and the opposing substrate 31 are opposed via the liquid crystal material 32, and, between the TFT substrate 30 and the opposing substrate 31, there are also disposed spacers 50 to keep the gap between both substrates 30 and 31 constant. On the inner surface of the TFT substrate 30 having the pixel electrodes 48 formed thereon, there is formed an alignment film 49 which covers the pixel electrodes 48. Also, on the inner surface of the opposing substrate 31 which opposes the alignment film 49 formed on the surface of the TFT substrate 30, there is formed an alignment film 51.

The alignment film 51 on the opposing substrate 31 is formed such that the alignment film 51 covers a transparent common electrode 52 formed on the opposing substrate 31. The transparent common electrode 52, each of the pixel electrodes 48 and the liquid crystal material 32 disposed therebetween form pixel capacitance.

Further, on the outside surfaces of the TFT substrate 30 and the opposing substrate 31, that is, on the lower surface of the TFT substrate 30 and the upper surface of the opposing substrate 31 in FIG. 8, there are formed a TFT side polarizer film 53 and a opposing substrate side polarizer film 54, respectively.

In the above-mentioned embodiment, the light shield film is not formed on the portions of the scanning lines between the data lines. However, when the etchant for etching the light shield film flows in a direction crossing the data lines, it is also possible to remove the light shield film on the data lines partially along the length of the data lines.

Next, with reference to the drawings, an explanation will be made on a second embodiment of the present invention.

Figure 9:
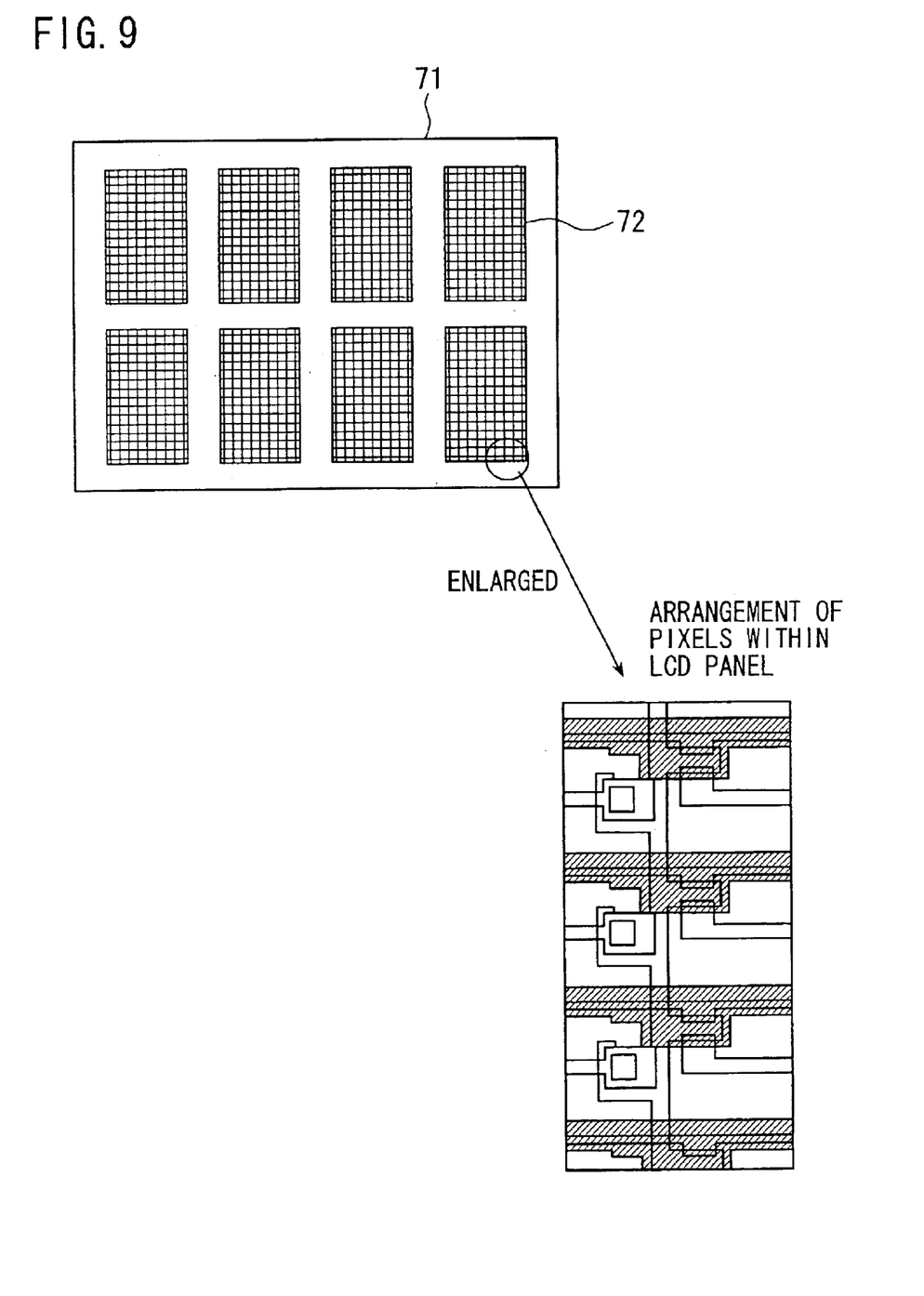
FIG. 9 includes a schematic plan view of liquid crystal display panels which are formed on a glass substrate and which are under fabrication, and an enlarged partial view of one of the liquid crystal display panels.

FIG. 9 is a schematic plan view of liquid crystal display panels which are formed on a glass substrate and which are under fabrication. FIG. 9 also includes an enlarged partial view of one of the liquid crystal display panels formed on the glass substrate. For example, assume that liquid crystal display panels 72 each having a size of 6.3 inches are to be disposed effectively on a glass substrate 71 having the sizes of 370 mm×470 mm. In such case, as shown in FIG. 9, it is possible to dispose, on the glass substrate 71, four panels 72 along the longitudinal direction of the glass substrate 71 and two panels 72 along the direction perpendicular to the longitudinal direction of the glass substrate 71. Therefore, a total of eight liquid crystal display panels 72 are formed on the glass substrate 71. Also, as can be seen from the partial enlarged view of the liquid crystal display panel 72, each of pixel electrodes has an elongated rectangular shape, and the longitudinal direction of each of the pixel electrodes coincides with the longitudinal direction of the glass substrate 71.

Figure 10:
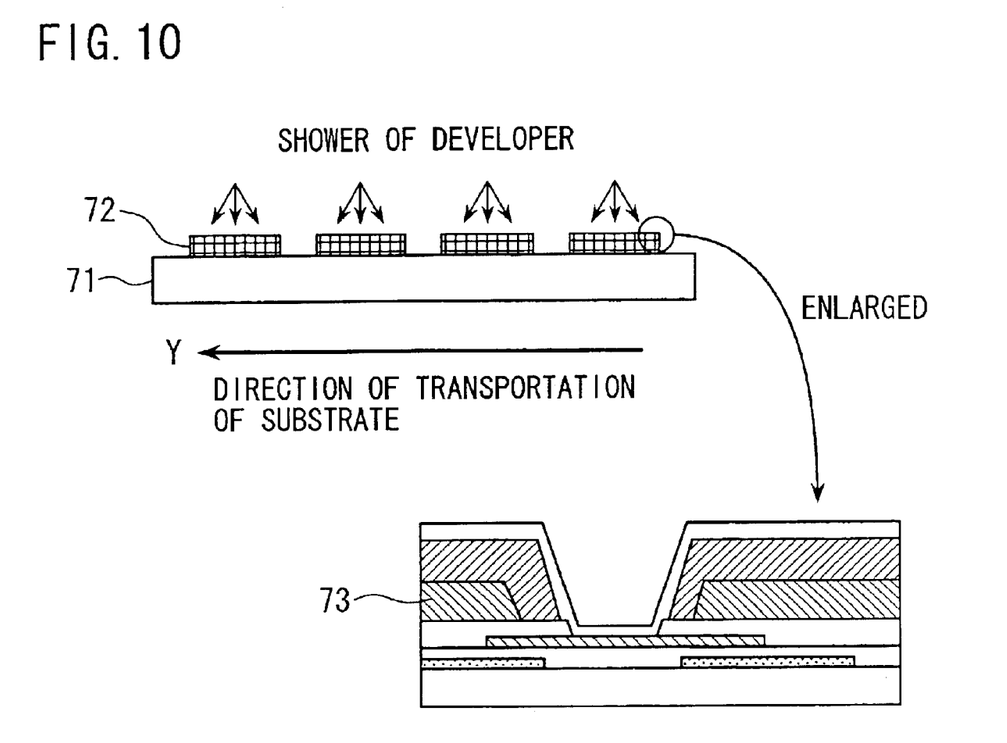
FIG. 10 includes a side view illustrating a process of removing a photoresist film by using a developer in a process of forming a light shield film, and an enlarged partial cross sectional view showing a contact hole portion of a liquid crystal display panel.

FIG. 10 is a side view illustrating a process of removing a photoresist film in which insulating carbon or the like is dispersed, by using a developer, after an exposure in a process of forming a light shield film. FIG. 10 also includes an enlarged partial cross sectional view showing a contact hole portion of a liquid crystal display panel.

After forming color filters, a process is performed in which a photoresist film having insulating carbon and the like dispersed in acrylic resin is applied onto a TFT substrate. The photoresist film is then exposed and, thereafter, portions of the photoresist film which are not cured are removed by using a developer.

In this case, as shown in FIG. 10, liquid crystal display panels 72 before development are formed on a glass substrate 71. The developer is showered from upside onto the glass substrate 71, and the glass substrate 71 is transported in a direction Y shown in FIG. 10, which direction corresponds to the longitudinal direction of the glass substrate 71.

As described with reference to FIG. 9 above, each of the pixel electrodes has an elongated rectangular shape, and the longitudinal direction of each of the pixel electrodes coincides with the longitudinal direction of the glass substrate 71. In such constitution, the developer flows in the longitudinal direction of each pixel electrode, and the developer can flow easily and smoothly. Therefore, as shown in FIG. 10, in such constitution, residue of the photoresist film does not remain within the contact hole.

As a result, probability of occurrence of defective contacts, i.e., dot defects, caused by the residue of the light shield film resin after development can be greatly reduced. The number of dot defects per panel is reduced approximately to 0–5.

In the enlarged cross sectional view of FIG. 10, the structure in which a light shield film is not formed on the color filter 73 is shown. However, the present invention can also be applied to a case in which a light shield film is formed on the color filter 73. When the light shield film is formed on the color filter 73 in accordance with the present invention, although the residue can not be removed completely, it is possible to remove the residue quite satisfactorily.

Also, in the liquid crystal display according to each of the first and second embodiments mentioned above, the storage capacitance has a gate storage structure. However, the present invention is also applicable to a liquid crystal display in which the storage capacitance has a common storage structure.

As mentioned above, according to the present invention, the light shield film is not formed on the scanning lines except portions intersecting the data lines and, therefore, the step height of each contact hole portion becomes small. Therefore, when the light shield film resin is removed by using the developer, no residue of the light shield film resin remains in the contact hole, and the passivation film within the contact hole can be completely removed.

Also, according to the present invention, each of the pixel electrodes has an elongated rectangular shape, and the developer flows in the longitudinal direction of each pixel electrode. Therefore, the developer can flow easily and smoothly, and residue of the light shield film resin does not remain within the contact hole. As a result, probability of occurrence of defective contacts, i.e., dot defects, caused by the residue of the light shield film resin after development can be greatly reduced.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as falling within the scope of the appended claims.

What is claimed is:

1. A method of manufacturing a liquid crystal display having a plurality of parallel scanning lines, a plurality of parallel data lines which cross said scanning lines to form intersections with said scanning lines, thin film transistors each disposed in the proximity of an intersection between one of said scanning lines and one of said data lines, and pixel electrodes disposed in a matrix and each coupled with one of said thin film transistors, said method comprising:

forming a light shield film that covers the thin film transistors and the entirety of the data lines but does not cover portions of the scanning lines that extend between said intersections with respective ones of said data lines and that are not adjacent to said thin film transistors.

2. A method of manufacturing a liquid crystal display as set forth in claim 1, wherein said liquid crystal display comprises a contact hole in each of areas surrounded by said scanning lines and said data lines, and wherein said portions of said scanning lines that are not covered by said light shield film include portions that are adjacent to said contact holes.

3. A method of manufacturing a liquid crystal display as set forth in claim 1, wherein each of said pixel electrodes is formed into an elongated rectangular shape.

4. A liquid crystal display comprising:

a plurality of scanning lines disposed parallel to each other;

a plurality of data lines which are disposed parallel to each other and which cross said scanning lines so as to form intersections of said scanning lines with respective ones of said data lines;

thin film transistors each disposed in the proximity of an intersection between one of said scanning lines and one of said data lines;

pixel electrodes disposed in a matrix and each coupled with one of said thin film transistors; and a light shield film that covers the thin film transistors and the entirety of the data lines but does not cover portions of the scanning lines that extend between said intersections of said scanning lines with respective ones of said data lines and that are not adjacent to said thin film transistors.

5. A liquid crystal display as set forth in claim 4, wherein said liquid crystal display comprises a contact hole in each of areas surrounded by said scanning lines and said data lines, and wherein said portions of said scanning lines that are not covered by said light shield film include portions that are adjacent to said contact holes.

6. A liquid crystal display as set forth in claim 4, wherein each of said pixel electrodes has an elongated rectangular shape which is elongated along said data lines.

7. A liquid crystal display comprising:

a plurality of scanning lines disposed parallel to each other;

a plurality of data lines which are disposed parallel to each other and which cross said scanning lines;

thin film transistors each disposed in the proximity of an intersection between one of said scanning lines and one of said data lines;

pixel electrodes disposed in a matrix and each coupled with one of said thin film transistors; and a light shield film that covers the thin film transistors and the entirety of the data lines but does not cover portions of the scanning lines that are adjacent to contact holes located in each of areas surrounded by said scanning lines and said data lines.

* * * * *